(12) United States Patent
Yamamoto (10) Patent No.: US 9,386,173 B2
(45) Date of Patent: Jul. 5, 2016

(54) PRINTING SYSTEM, PRINTER, JOB PROCESSING METHOD AND COMPUTER READABLE RECORDING MEDIUM STORING JOB PROCESSING PROGRAM

(71) Applicant: Konica Minolta Inc., Tokyo (JP)

(72) Inventor: Taro Yamamoto, Toyonaka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/557,809

(22) Filed: Dec. 2, 2014

(65) Prior Publication Data

US 2015/0156351 A1  Jun. 4, 2015

(30) Foreign Application Priority Data

Dec. 3, 2013  (JP) ................. 2013-249976

(51) Int. Cl.
*H04N 1/00* (2006.01)
*H04N 1/32* (2006.01)

(52) U.S. Cl.
CPC ....... *H04N 1/00347* (2013.01); *H04N 1/00973* (2013.01); *H04N 1/3255* (2013.01); *H04N 1/32363* (2013.01); *H04N 1/32406* (2013.01); *H04N 1/32523* (2013.01); *H04N 1/32545* (2013.01); *H04N 2201/0094* (2013.01)

(58) Field of Classification Search
USPC ........................................................ 358/1.15
See application file for complete search history.

(56) References Cited

U.S. PATENT DOCUMENTS

| 2006/0282466 A1* | 12/2006 | Yasukaga | G06F 21/606 |
| 2010/0082709 A1* | 4/2010 | Yamamoto | G06F 17/30011 707/812 |
| 2014/0211257 A1* | 7/2014 | Ishii | H04N 1/32539 358/1.15 |

FOREIGN PATENT DOCUMENTS

| JP | 11-039115 A | 2/1999 |
| JP | H11-102263 | 4/1999 |
| JP | 2004-021454 | 1/2004 |

(Continued)

OTHER PUBLICATIONS

Norihiko, Print System, Nov. 30, 2006, Machine Translated Japanese Patent Application Publication, JP2006321185. All Pages.*

(Continued)

*Primary Examiner* — Ngon Nguyen
(74) *Attorney, Agent, or Firm* — Buchanan Ingersoll & Rooney PC (57) ABSTRACT

A printing system includes a plurality of printers capable of communicating with each other, wherein each of the plurality of printers includes a communication unit configured to transmit/receive a job, a determination unit configured to determine whether print setting of a received job is processable by a printing function of the printer, and a storage unit configured to store the job in a memory, and each of the plurality of printers stores the job in the memory by the storage unit when the print setting of the received job is determined to be processable by the determination unit by the printing function of the printer and transfers the job by the communication unit to any printer of the plurality of printers when the print setting is determined to be not processable.

32 Claims, 7 Drawing Sheets

(56) References Cited

FOREIGN PATENT DOCUMENTS

| | | |
|---|---|---|
| JP | 2006-321185 A | 11/2006 |
| JP | 2006-344049 | 12/2006 |
| JP | 2010-247499 | 11/2010 |
| JP | 2012-245691 | 12/2012 |
| JP | 2013-037460 A | 2/2013 |

OTHER PUBLICATIONS

Notification of Reasons for Rejection issued in corresponding Japanese Patent Application No. 2013-249976; dated Dec. 1, 2015, with English Abstract (9 pages).

* cited by examiner

SELECTED JOB CANNOT BE
PRINTED BY THIS PRINTER.
THIS MAY BE PRINTED BY PRINTER E.

FIG. 7B

PUNCHING SET ON SELECTED JOB
IS NOT AVAILABLE BY THIS PRINTER.
PUNCHING IS AVAILABLE BY
PRINTER E.

| FINISH | CONTINUE |

PRINTING SYSTEM, PRINTER, JOB PROCESSING METHOD AND COMPUTER READABLE RECORDING MEDIUM STORING JOB PROCESSING PROGRAM

The entire disclosure of Japanese Patent Application No. 2013-249976 filed on Dec. 3, 2013 including description, claims, drawings, and abstract are incorporated herein by reference in its entirety.

BACKGROUND OF THE INVENTION

1. Field of the Invention

The present invention relates to a printing system, a printer, a job processing method, and a computer readable recording medium storing a job processing program and especially relates to a printing system including a plurality of printers, the printers included in the system, a job processing method in the system, and a computer readable recording medium storing a job processing program in the printer.

2. Description of the Related Art

There is a system including a plurality of printers and a print server for spooling a job issued from a client device as an example of a printing system. In this system, a user may issue the job from the client device to the print server to spool and log in to an optional printer out of a plurality of printers to instruct the same to print. The printing system is also referred to as "ubiquitous printing" and the user may print by using an optional printer at optional timing (anytime and anywhere).

Recently, the printing system in which any of a plurality of printers has a function of the print server is also suggested in association with an enlarged memory of the printer. In this printing system, the user may issue the job to any of the printers to spool and print the same by using another printer. This printing system is also referred to as "serverless ubiquitous printing".

A plurality of printers included in the printing system may have different functions. In this case, an application for issuing the job in the client device can perform print setting of the job when the function may be realized by any of the printers. Therefore, there might be a case in which the printer which spools the job does not have the function for the print setting of the job.

When the printing system does not include a device capable of managing a plurality of printers in an integrated manner such as the print server as described above, it is not possible to manage in an integrated manner which printer may print the job from the client device. Therefore, it is difficult for the user to determine the printer to be used for printing the issued job if the user does not sufficiently grasp the function of each printer. When the printer which spools the job is different from the printer instructed by the user to print, the job is transferred from the printer which spools the job to the printer which prints after a print instruction is received from the user, so that there is a problem that printing is executed with delay.

SUMMARY OF THE INVENTION

The present invention has been made in view of such problem and an object thereof is to provide a printing system, a printer, a job processing method, and a job processing program capable of shorten waiting time for the user of the printing system including a plurality of printers to obtain a printed material.

To achieve at least one of the above-mentioned objects, according to an aspect, a printing system reflecting one aspect of the present invention comprises a plurality of printers capable of communicating with each other. Each of a plurality of printers includes a communication unit configured to transmit/receive a job, a determination unit configured to determine whether print setting of a received job is processable by a printing function thereof, and a storage unit configured to store the job in a memory. Each of a plurality of printers stores the job in the memory by the storage unit when the print setting of the received job is determined to be processable by the printing function thereof and transfers the job by the communication unit to any printer of a plurality of printers when the print setting is determined to be not processable.

To achieve at least one of the above-mentioned objects, according to an aspect, a printer reflecting one aspect of the present invention comprises a communication unit configured to communicate with another printer, a determination unit configured to determine whether print setting of a received job is processable by a printing function thereof, and a storage unit configured to store the job in a memory. The storage unit stores the job in the memory when the determination unit determines that the print setting of the received job is processable by the printing function thereof, and the communication unit transfers the job to any printer of a plurality of printers when the determination unit determines that the print setting of the received job is not processable by the printing function thereof.

To achieve at least one of the above-mentioned objects, according to an aspect, a job processing method of processing a job in a printing system reflecting one aspect of the present invention comprises a plurality of printers capable of communicating with each other, wherein a first printer out of a plurality of printers includes steps of determining, when receiving the job, whether print setting of the job is processable by a printing function of the first printer, storing the job in a memory of the first printer when the print setting of the job is determined to be processable by the printing function of the first printer at the step of determining, and transferring the job from the first printer to a second printer being any printer of a plurality of printers when the print setting of the job is determined to be not processable by the printing function of the first printer at the step of determining.

To achieve at least one of the above-mentioned objects, according to an aspect, a non-transitory recording medium storing a computer readable program which processes a job reflecting one aspect of the present invention is a non-transitory recording medium storing a computer readable program which allows a printer to execute a process of a job in a printing system including a plurality of printers capable of communicating with each other, wherein the program allows the printer to execute steps of receiving the job from another device, determining whether print setting of the received job is processable by a printing function of the printer itself, storing the job in a memory of the printer when the print setting of the received job is determined to be processable by the printing function of the printer itself, and transferring the job to any printer of a plurality of printers when the print setting of the received job is determined to be not processable by the printing function of the printer itself.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

In the following description, the same reference sign is assigned to the same part and component. The name and function thereof are the same. Therefore, the description thereof is not repeated.

<System Configuration>

Figure 1:
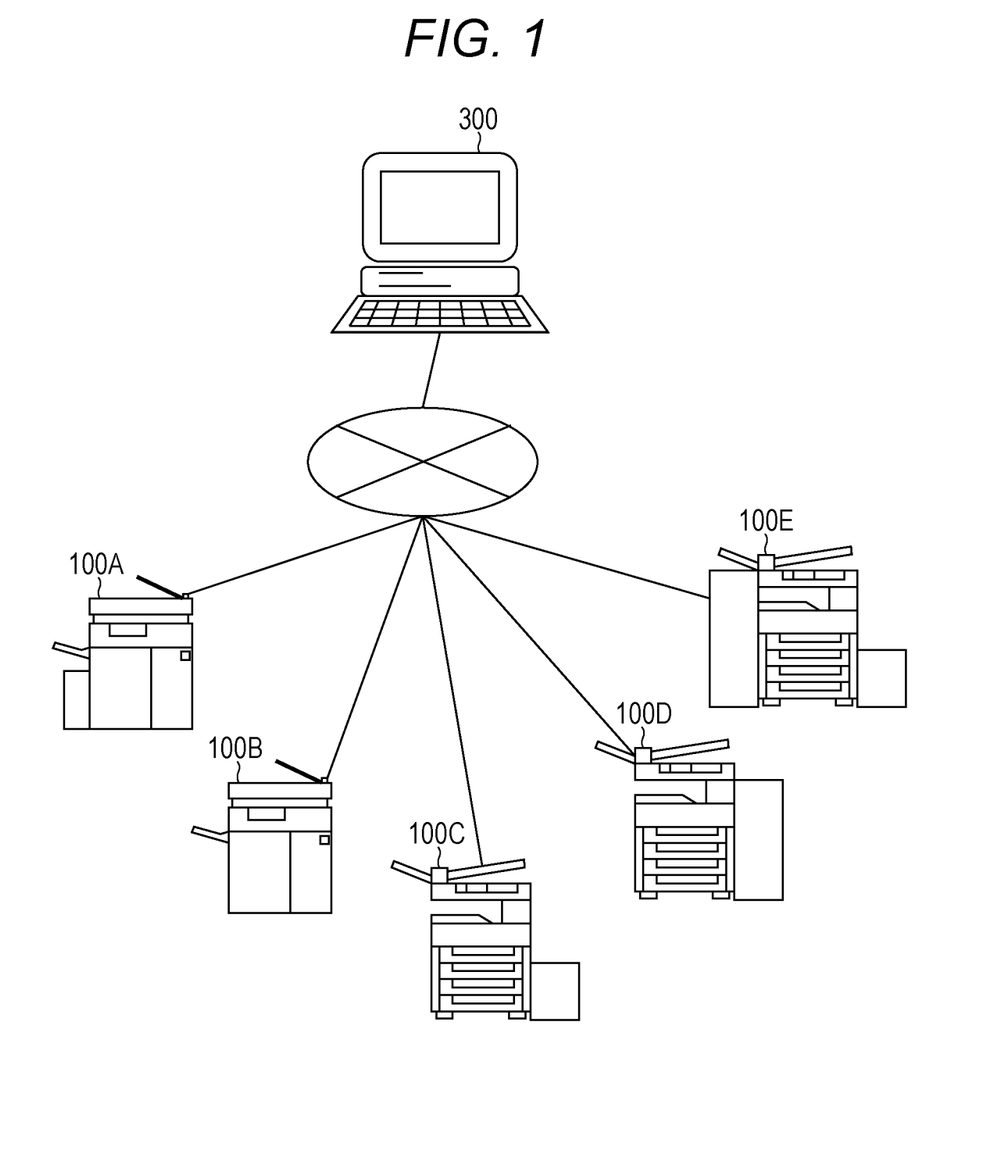
FIG. 1 is a view illustrating a specific example of a configuration of a printing system (hereinafter, referred to a system) of an embodiment.

FIG. 1 is a view illustrating a specific example of a configuration of a printing system (hereinafter, referred to as a system) according to this embodiment. With reference to FIG. 1, this system includes a plurality of MFPs (multi-functional peripherals) 100A to 100E as an example of printers and a PC (personal computer) 300 as an example of a client device. A plurality of MFPs 100A to 100E is representatively referred to as an MFP 100.

The MFP 100 and the PC 300 are connected to a network such as a LAN (local area network) and may communicate with each other. The network may be a wired or wireless network.

Any printer may serve as the printer included in this system as long as this at least has a communication function of communicating through the above-described network and a printing function. Although the MFP is a combined machine having a scanning function and the like in addition to the above-described functions in this example, the printer without the scanning function and the like may also be used.

<Device Configuration>

Figure 2:
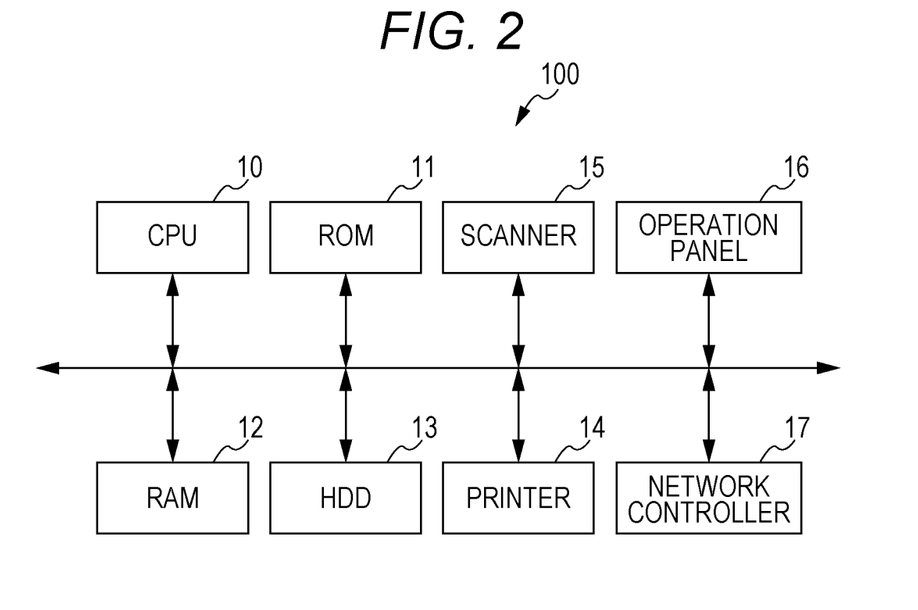
FIG. 2 is a block diagram illustrating a specific example of a device configuration of an MFP (multi-functional peripheral) included in the system.
Figure 3:
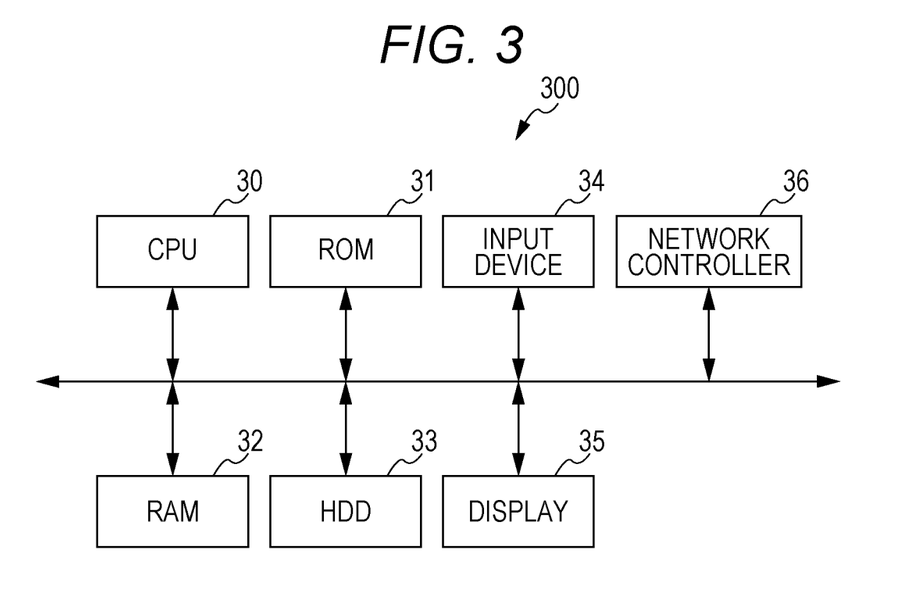
FIG. 3 is a block diagram illustrating a specific example of a device configuration of a PC (personal computer) included in the system.

FIGS. 2 and 3 are block diagrams illustrating a specific example of a device configuration of the MFP 100 and that of the PC 300, respectively.

With reference to FIG. 2, the MFP 100 includes a CPU (central processing unit) 10 for controlling an entire device, a ROM (read only memory) 11 being a memory for storing a program executed by the CPU 10, a RAM (random access memory) 12 being a memory which stores a value used when the program is executed by the CPU 10 and serves as a working area, a HDD (hard disk drive) 13 being an example of a large-scale storage device for storing image data and the like, a printer 14, a scanner 15, an operation panel 16, and a network controller 17 for controlling communication through the above-described network.

With reference to FIG. 3, the PC 300 includes a CPU 30 for controlling an entire device, a ROM 31 being a memory for storing a program executed by the CPU 30, a RAM 32 being a memory which stores a value used when the program is executed by the CPU 30 and serves as a working area, a HDD 33 being an example of a large-scale storage device for storing various pieces of information, an input device 34 such as a keyboard, a display 35, and a network controller 36 for controlling the communication through the above-described network.

<Operation Overview>

Figure 4:
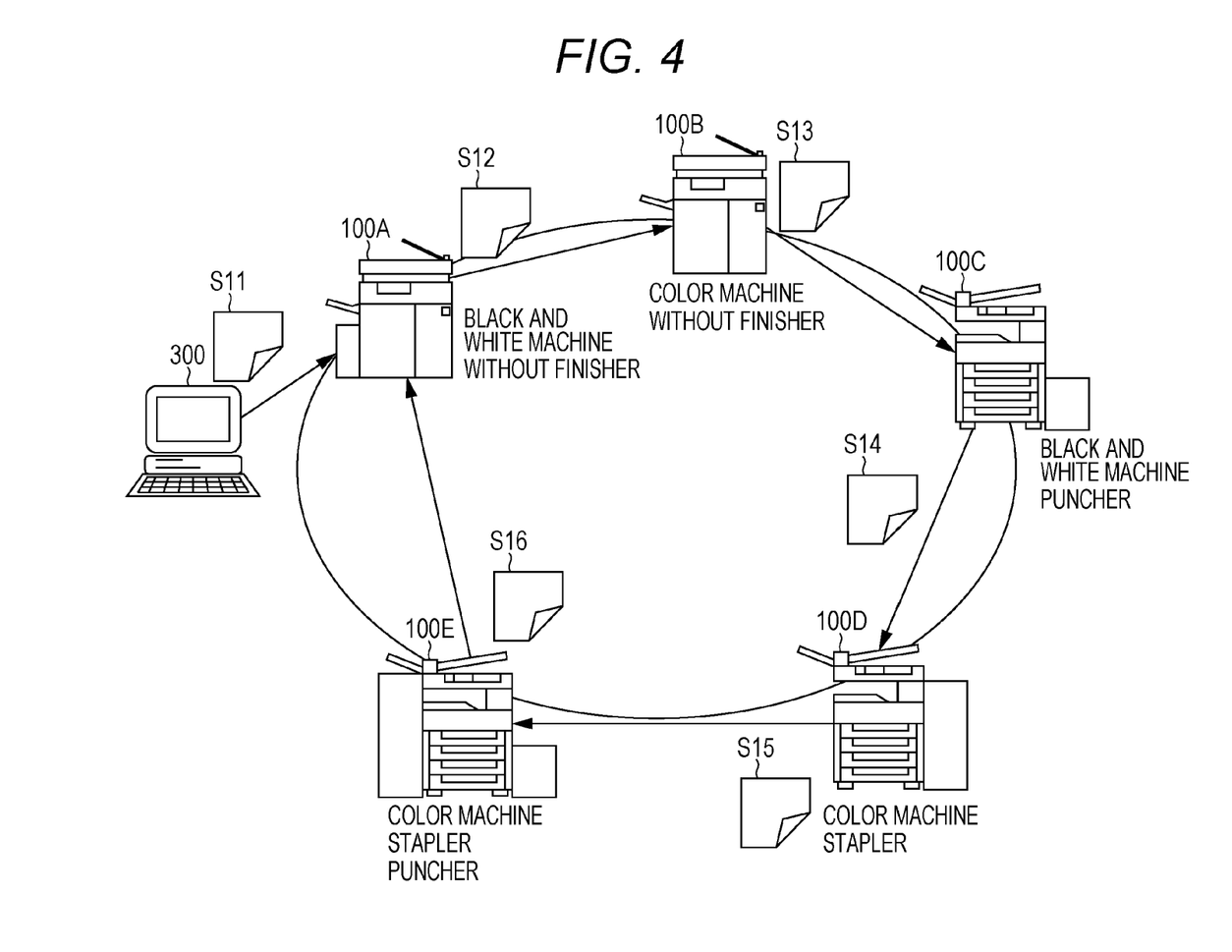
FIG. 4 is a view illustrating an operation overview in the system.
Figure 5:
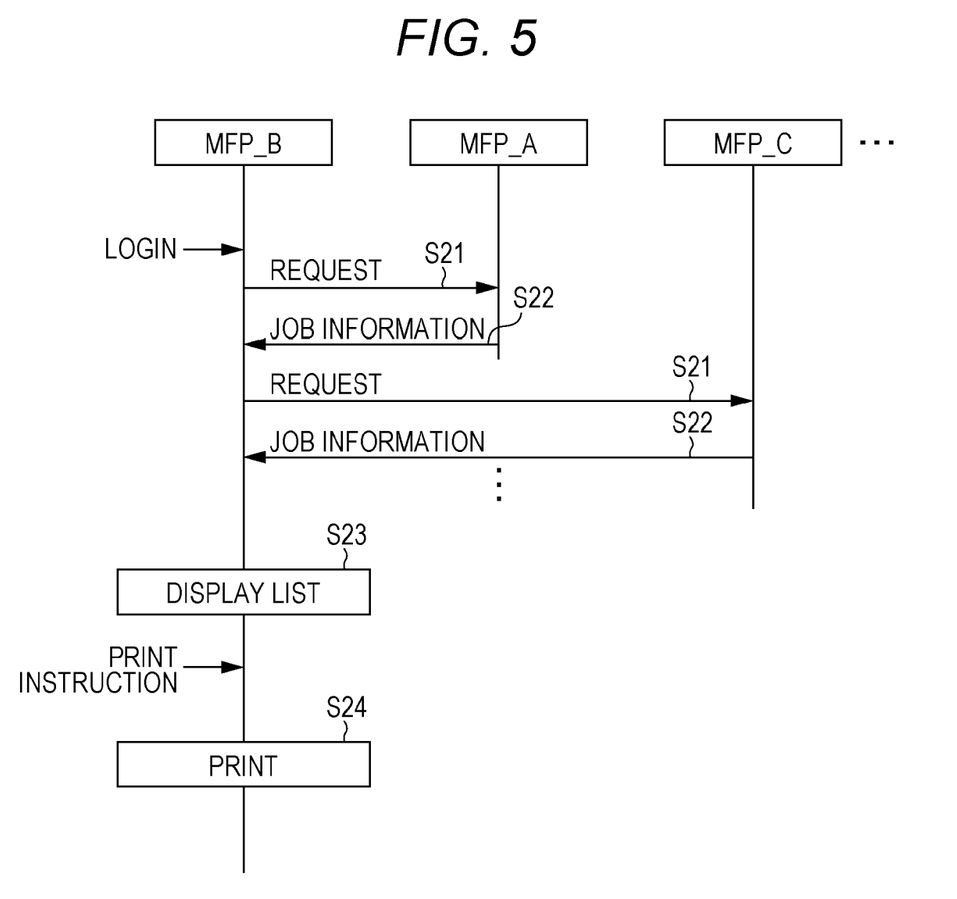
FIG. 5 is a view illustrating the operation overview in the system.

FIGS. 4 and 5 are views illustrating an operation overview in this system. In this system, a user issues a print job to any MFP 100 of a plurality of MFPs 100A to 100E included in this system and allows the MFP 100 to spool the print job by using the PC 300. The print job is also referred to as a ubiquitous job. The operation overview so far is illustrated in FIG. 4.

Next, the user logs in to an optional MFP 100 of a plurality of MFPs 100A to 100E included in this system and issues an instruction to the MFP 100 to perform print processing of the ubiquitous job issued by the user to be spooled in any MFP 100. The operation overview so far is illustrated in FIG. 5.

With reference to FIG. 4, the PC 300 generates the print job being the ubiquitous job by using a printer driver installed thereon according to user operation. The PC 300 issues the generated ubiquitous job to the MFP 100 (step S11).

When the PC 300 generates or issues the ubiquitous job, this sets a print condition (print setting) on the job by using the printer driver. The printer driver selectably presents the printing functions of all the MFPs 100A to 100E included in this system and accepts selection when receiving an instruction of the print setting from the user. Information indicating the print setting is added to the ubiquitous job to be transferred to the MFP 100.

The MFP 100 to which the PC 300 issues (transfers) the ubiquitous job may be specified in advance for the PC 300 or the user. In an example in FIG. 4, the PC 300 issues the ubiquitous job to the MFP 100A.

Correspondence relationship between the PC 300 or the user and the MFP 100 may also be specified in the printer driver. Alternatively, the printer driver may check a load condition of each MFP 100 included in the system to select an appropriate MFP 100 such as the MFP 100 a load of which is the smallest, for example, when issuing the ubiquitous job.

The MFP 100A which receives the ubiquitous job from the PC 300 compares the printing function thereof with the print setting of the ubiquitous job to determine whether this may print with the set print condition. When this determines that this cannot print, this transfers the ubiquitous job to the MFP 100B being another MFP 100 specified in advance out of a plurality of MFPs 100A to 100E included in this system (step S12).

In the example in FIG. 4, the MFP 100A has a monochrome (black-and-white) printing function and is not provided with a finisher. Therefore, when color printing and post-processing with the finisher are set on the ubiquitous job as the print condition, the MFP 100A determines that this cannot print the same. The MFP 100A stores in advance that another MFP 100 to which the ubiquitous job is transferred when this determines in this manner is the MFP 100B. Therefore, when the MFP 100A determines in the above-described manner, this transfers the ubiquitous job to the stored MFP 100B.

Next, the MFP 100B which receives the transferred ubiquitous job determines in the same manner. That is to say, the MFP 100B has the color printing function and is not provided with the finisher. Therefore, when the post-processing with the finisher is set on the ubiquitous job as the print condition, the MFP 100B determines that this cannot print the same. The MFP 100B stores in advance that another MFP 100 to which the ubiquitous job is transferred when this determines in this manner is the MFP 100C. Therefore, when the MFP 100B determines in the above-described manner, this transfers the ubiquitous job to the stored MFP 100C (step S13).

Next, the MFP 100C which receives the transferred ubiquitous job determines in the same manner. That is to say, the MFP 100C has the monochrome (black-and-white) printing function and is provided with a puncher as the finisher. Therefore, when the color printing and the post-processing other than punching such as stapling are set on the ubiquitous job as the print condition, the MFP 100C determines that this cannot print the same. The MFP 100C stores in advance that another MFP 100 to which the ubiquitous job is transferred when this determines in this manner is the MFP 100D. Therefore, when the MFP 100C determines in the above-described manner, this transfers the ubiquitous job to the stored MFP 100D (step S14).

Next, the MFP 100D which receives the transferred ubiquitous job determines in the same manner. That is to say, the MFP 100D has the color printing function and is provided with a stapler as the finisher. Therefore, when the color printing and the post-processing other than the stapling such as the punching are set on the ubiquitous job as the print condition, the MFP 100D determines that this cannot print the same. The MFP 100D stores in advance that another MFP 100 to which the ubiquitous job is transferred when this determines in this manner is the MFP 100E. Therefore, when the MFP 100D determines in the above-described manner, this transfers the ubiquitous job to the stored MFP 100E (step S15).

Next, the MFP 100E which receives the transferred ubiquitous job determines in the same manner. That is to say, the MFP 100E has the color printing function and is provided with the stapler and the puncher as the finisher. Therefore, when the post-processing other than the stapling and the punching is set on the ubiquitous job as the print condition, the MFP 100E determines that this cannot print the same. The MFP 100E stores in advance that another MFP 100 to which the ubiquitous job is transferred when this determines in this manner is the MFP 100A. Therefore, when the MFP 100E determines in the above-described manner, this transfers the ubiquitous job to the stored MFP 100A (step S16).

Meanwhile, when the transferred ubiquitous job has the print setting such that this can be printed by the printing function of none of the MFPs 100, the ubiquitous job is continuously transferred among a plurality of MFPs 100 included in this system in the example in FIG. 4. Therefore, each MFP 100 preferably has a mechanism which prevents the transfer of more than one cycle among a plurality of MFPs 100 included in this system.

The ubiquitous job includes a parameter (counter) for counting the number of times of transfer as an example of the above-described mechanism. The printer driver installed on the PC 300 may add the parameter in the ubiquitous job when issuing the ubiquitous job. Alternatively, when the MFP 100 receives the ubiquitous job from the PC 300 or when this receives the ubiquitous job transferred from another MFP 100, if the above-described parameter is not included in the ubiquitous job, the MFP 100 may assign the parameter to the ubiquitous job. When the parameter is included, the MFP 100 checks the parameter when transferring the ubiquitous job, and if a value indicating the number of times of transfer is not larger than the total number of MFPs 100 included in this system stored in advance (five in the example in FIG. 4), this may determine to transfer after incrementing the parameter by one.

As another example of the above-described mechanism, each MFP 100 may also store a transfer history for each ubiquitous job. It is at least described in the transfer history whether the ubiquitous job is transferred. It is also possible that time and date of transfer, a transfer destination if the MFP 100 is different from the transfer destination specified in advance and the like are described as other information. The MFP 100 checks (whether there is) the transfer history about the ubiquitous job when transferring the ubiquitous job and may determine to transfer the same when this is not yet transferred (to the transfer destination specified in advance) so far.

The mechanism which prevents the transfer of more than one cycle of the ubiquitous job among a plurality of MFPs 100 included in this system is not limited to that in the above-described example but may be any other mechanism.

Furthermore, the above-described order of transfer may also be determined according to the user or a group of users who issue the ubiquitous job, a type of ubiquitous job (color/monochrome, type of finisher and the like). In this case, the MFP 100 as the transfer destination is stored in advance in each MFP 100 included in this system in relation to the user or the group of users, the type of ubiquitous job and the like, and the MFP 100 as the transfer destination may be selected according to the user or the group of users who issue the ubiquitous job, the type of ubiquitous job and the like.

Meanwhile, in the example in FIG. 4, it is configured such that, when the transferred ubiquitous job has the print setting such that this cannot be printed by all the printing functions of the MFPs 100A to 100E, the ubiquitous job is transferred in this order to return to the MFP 100A which first receives the ubiquitous job from the PC 300. In this case, the MFP 100A may notify the PC 300 that it is not possible to print the ubiquitous job with current print setting without storing the same in the memory thereof. Alternatively, the MFP 100A may store the ubiquitous job in the memory thereof and further present the print setting processable by the printing function thereof when receiving the instruction to print the ubiquitous job from the user. Furthermore, the ubiquitous job may be subjected to the above-described process by the MFP 100E without being transferred (returned) from the MFP 100E being the last MFP 100 to the MFP 100A being the first MFP 100.

With reference to FIG. 5, when the user who issues the ubiquitous job logs in to the MFP 100B being an optional MFP after the operation in FIG. 4, the MFP 100B requires information regarding the job issued by the login user (hereinafter, referred to as job information) of another MFP 100 included in this system (step S21). Then, each MFP 100 transmits the job information of a relevant job to the MFP 100B (step S22). Information which may at least specify the job, such as a job name, for example, may serve as the job information.

Figure 6:
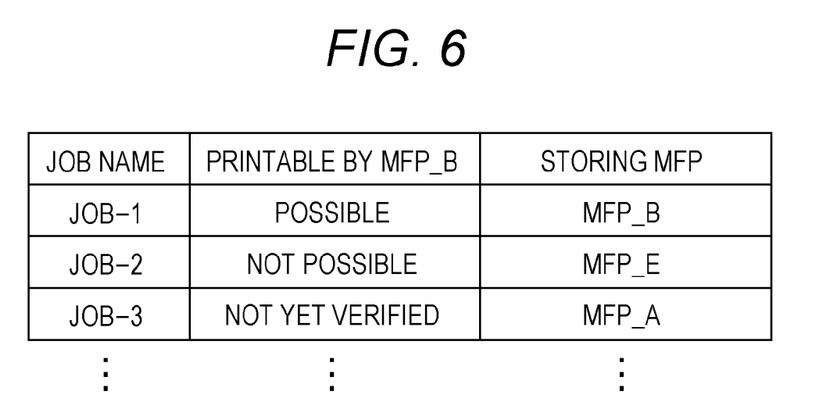
FIG. 6 is a view illustrating a specific example of display at step S23 in FIG. 4.

When the MFP 100B receives the job information of the job issued by the login user from each MFP 100, this selectably displays a list of the jobs, for example, lists them (step S23). FIG. 6 is a view illustrating a specific example of the display at step S23. With reference to FIG. 6, at step S23 described above, the MFP 100B presents the ubiquitous job of the login user issued to any MFP 100 included in this system to be spooled.

The MFP 100B preferably presents the MFP 100 being a transmission source of the job information, that is to say, the MFP 100 which stores the ubiquitous job in the memory together when displaying the list of the ubiquitous jobs of the login user as illustrated in FIG. 6. As described above, each MFP 100 included in this system stores the ubiquitous job on which the print setting which may be processed by the printing function thereof is set in the memory thereof, so that the MFP 100 which stores the ubiquitous job is the MFP 100 having the printing function capable of performing the print processing of the ubiquitous job. Therefore, the MFP 100B notifies of the MFP 100 capable of performing the print processing of the ubiquitous job for each ubiquitous job by presenting the transmission source of the job information.

The MFP 100B further preferably stores a result of determination of whether the ubiquitous job has the print setting such that this may be subjected to the print processing for each ubiquitous job and presents the result of determination together when displaying the list of the ubiquitous jobs of the login user as illustrated in FIG. 6. As described above, each MFP 100 included in this system transfers the ubiquitous job to the next MFP 100 when this cannot perform the process by the printing function thereof, so that it is also possible to determine that the ubiquitous job which is not stored in the memory of the MFP 100B and is stored in the memory of the MFP 100 the order of transfer of which is later than that of the MFP 100B cannot be subjected to the print processing by the MFP 100B. On the other hand, the ubiquitous job which is not stored in the memory of the MFP 100B and is stored in the memory of the MFP 100 the order of transfer of which is earlier than that of the MFP 100B is not yet determined as described above by the MFP 100B. Therefore, the MFP 100B presents that such job is "not yet verified". The example in FIG. 6 illustrates that the ubiquitous job the job name of which is "JOB-3" is stored in the memory of the MFP 100A the order of transfer of which is earlier than that of the MFP 100B in FIG. 4 and is not transferred to the MFP 100B. Therefore, when the MFP 100B obtains the job information of the ubiquitous job, this presents that the ubiquitous job is "not yet verified" as illustrated in FIG. 6.

Furthermore, the MFP 100B may display the ubiquitous job which cannot be processed by the printing function thereof, that is to say, the ubiquitous job which is not stored in the memory of the MFP 100B and is stored in the memory of the MFP 100 the order of transfer of which is later than that of the MFP 100B such that this cannot be selected in the list.

When the ubiquitous job stored in the memory of the MFP 100B, that is to say, the ubiquitous job determined to be processable by the MFP 100B is selected out of the listed ubiquitous jobs and the MFP 100B receives the instruction to print the same from the user, this executes the print processing of the specified ubiquitous job (step S24).

Figure 7A:
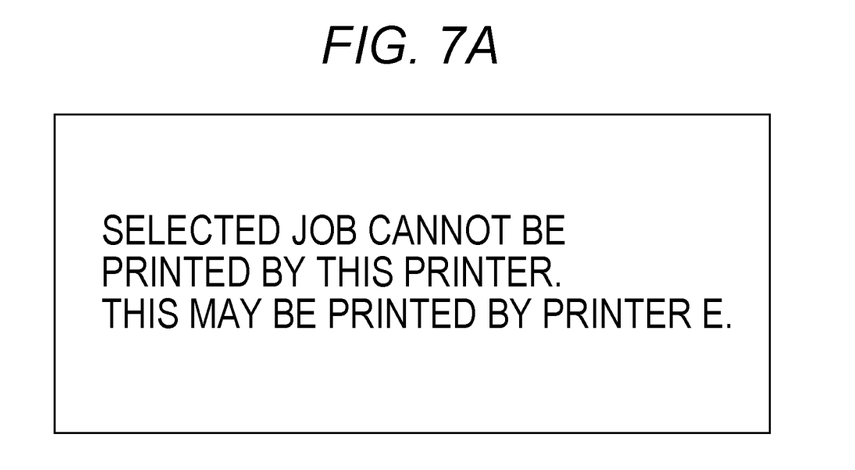
FIGS. 7A and 7B are views illustrating a specific example of display in the MFP.

When the ubiquitous job which is not stored in the memory of the MFP 100B, that is to say, the ubiquitous job determined to be not processable by the MFP 100B or the ubiquitous job not yet determined is selected out of the listed ubiquitous jobs and the MFP 100B receives the instruction to print from the user, this may display a message as illustrated in FIG. 7A to notify that the ubiquitous job cannot be printed by the same. Furthermore, this may also notify of the MFP 100 which stores the ubiquitous job in the memory, that is to say, the MFP 100 which may process the same.

Figure 7B:
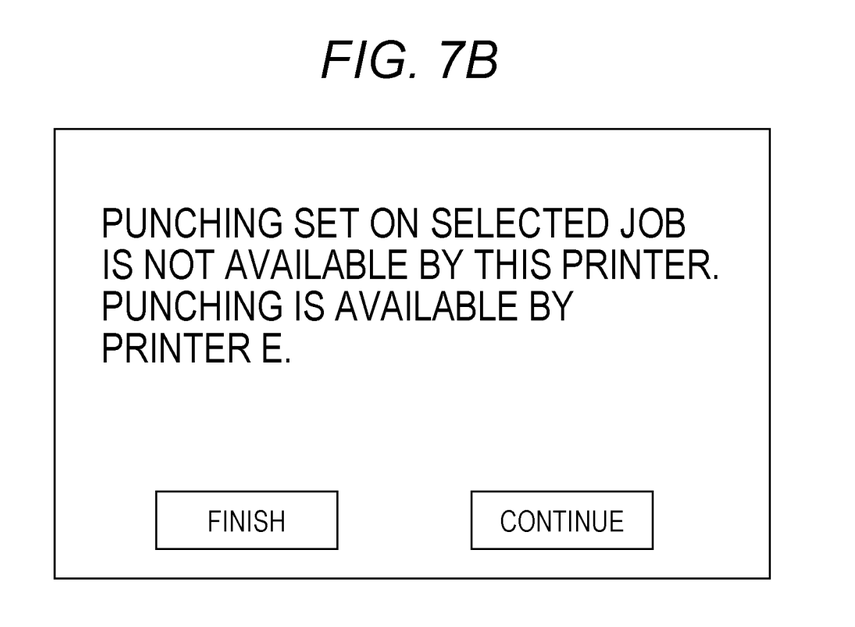

Alternatively, in this case, the MFP 100B may display a message illustrated in FIG. 7B to accept selection of whether to stop or continue the process of the ubiquitous job by the MFP 100B.

<Functional Configuration>

Figure 8:
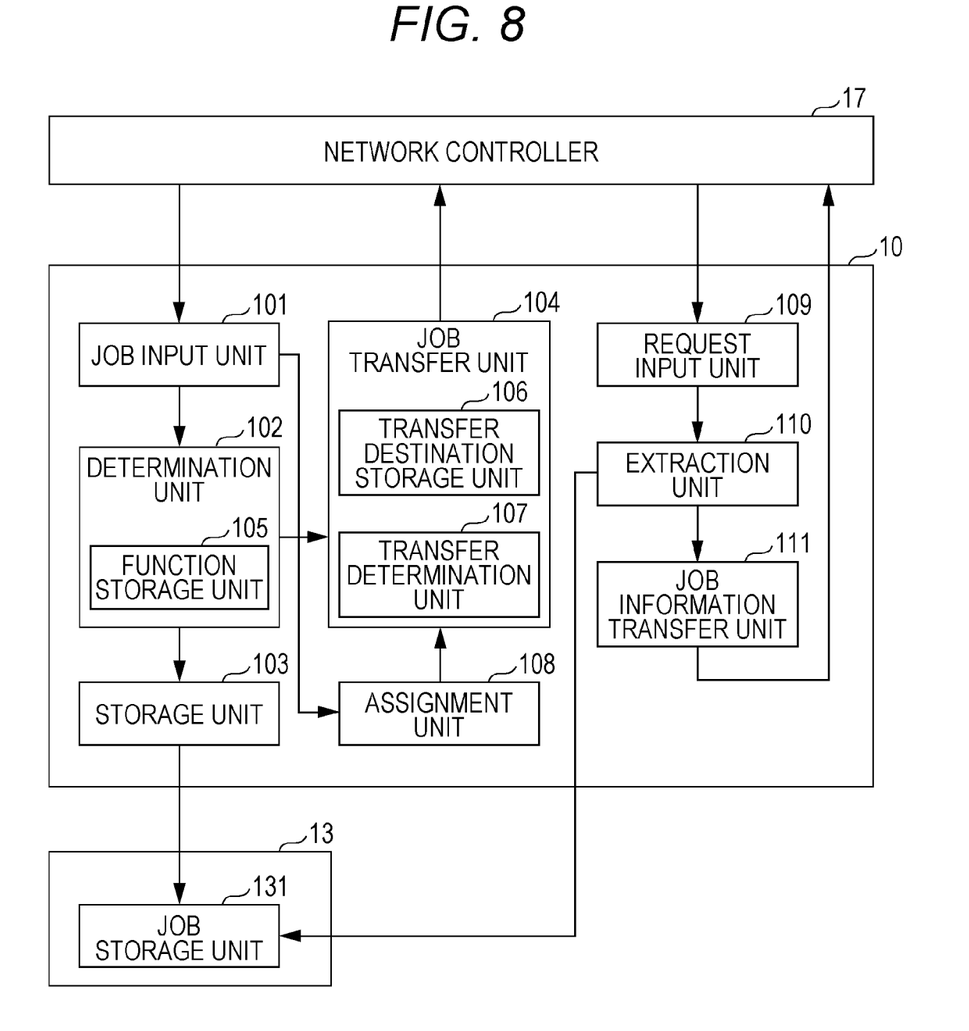
FIG. 8 is a block diagram illustrating a specific example of a functional configuration of the MFP.

FIG. 8 is a block diagram illustrating a specific example of a functional configuration of the MFP 100 for performing the above-described operation. The CPU 10 of the MFP 100 reads the program stored in the ROM 11 into the RAM 12 to execute, and each function in FIG. 8 is mainly realized by the CPU 10. However, at least a part of the functions may also be realized by another configuration illustrated in FIG. 2 or another hardware configuration such as an electric circuit not illustrated.

With reference to FIG. 8, a memory such as the HDD 13 includes a job storage unit 131 being a storage area for storing the ubiquitous job.

Further, with reference to FIG. 8, the CPU 10 includes a job input unit 101 for receiving an input of the ubiquitous job from another MFP 100 or the PC 300 through the network controller 17, a determination unit 102 including a function storage unit 105 for storing the printing function thereof for determining whether the ubiquitous job may be processed by comparing the print setting of the ubiquitous job with the printing function thereof, a storage unit 103 for storing the ubiquitous job in the job storage unit 131, a job transfer unit 104 including a transfer destination storage unit 106 for storing the MFP 100 being the transfer destination specified in advance for transferring the ubiquitous job to the above-described transfer destination through the network controller 17, a request input unit 109 for receiving a request of the job information of the ubiquitous job issued by the login user from another MFP 100 through the network controller 17, an extraction unit 110 for extracting the ubiquitous job issued by the login user from the job storage unit 131, and a job information transfer unit 111 for transferring the job information of the extracted job to the MFP 100 which requires the same through the network controller 17.

The storage unit 103 stores the ubiquitous job determined by the determination unit 102 to be processable by the printing function thereof in the job storage unit 131.

The job transfer unit 104 transfers the ubiquitous job determined by the determination unit 102 to be not processable by the printing function thereof to the MFP 100 stored in advance as the transfer destination in the transfer destination storage unit 106. The transfer destination storage unit 106 preferably stores a plurality of transfer destinations in relation to the user or the group of users, the type of ubiquitous job and the like. The job transfer unit 104 selects the MFP 100 as the transfer destination according to the user or the group of users who issue the ubiquitous job, the type of ubiquitous job and the like.

The job transfer unit 104 preferably includes a transfer determination unit 107 for determining whether it is possible to transfer. As an example, when the ubiquitous job includes the parameter for counting the number of times of transfer, the transfer determination unit 107 compares the number of times of transfer read from the parameter with the stored total number of MFPs 100 included in this system and determines that it is possible to transfer when the number of times of transfer is not larger than the total number of the MFPs 100. When the former is larger than the latter, it is determined that it is not possible to transfer. Then, the job transfer unit 104 increments the parameter by one at the time of the transfer.

Meanwhile, the CPU 10 preferably further includes an assignment unit 108 for assigning the parameter when the received ubiquitous job does not include the above-described parameter.

As another example, the transfer determination unit 107 may store the transfer history indicating the MFP 100 to which the ubiquitous job is transferred for each ubiquitous job and determine whether to transfer the received ubiquitous job to the MFP 100 specified as the next transfer destination by referring to the transfer history. That is to say, the transfer determination unit 107 may determine whether it is possible to transfer so as to prevent the transfer of more than one cycle among a plurality of MFPs 100 included in this system by preventing the ubiquitous job from being transferred to the same MFP 100 twice.

<Operation Flow>

Figure 9:
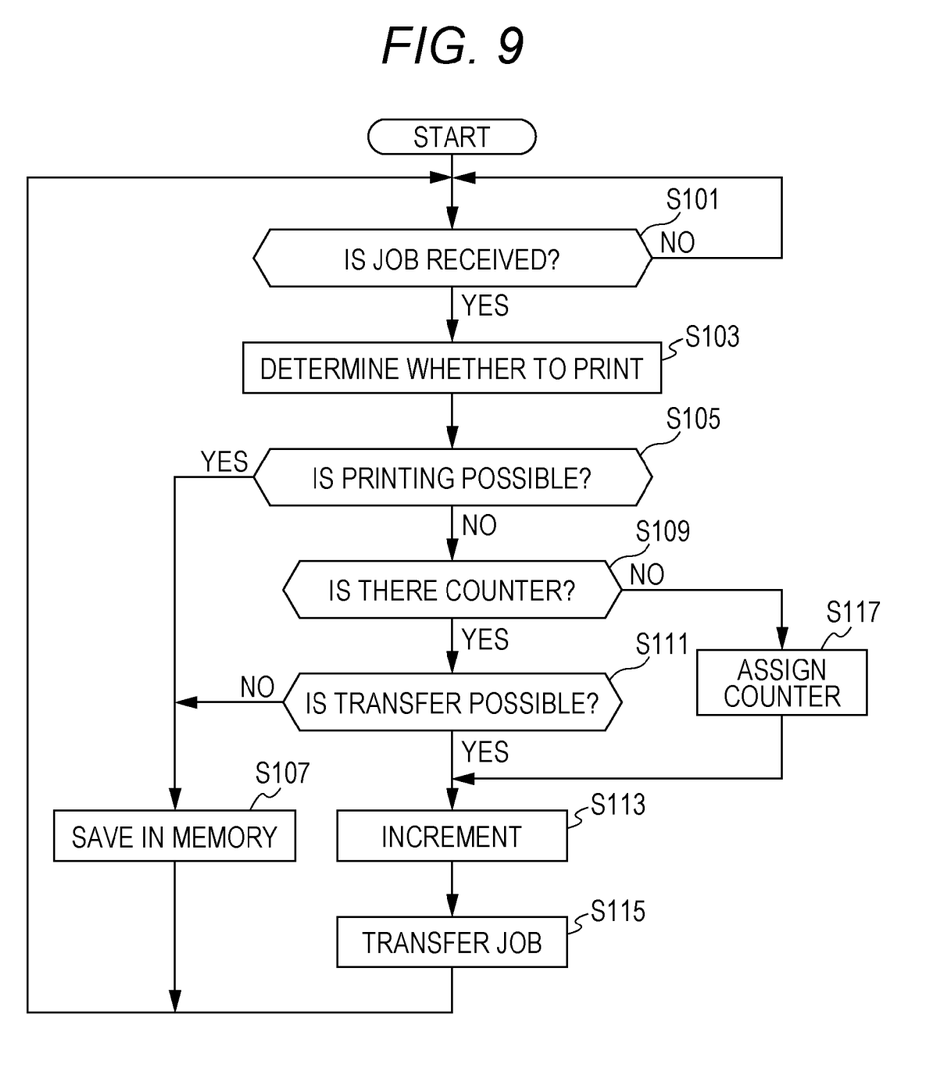
FIG. 9 is a flowchart illustrating a specific example of operation when the MFP spools a ubiquitous job.

FIG. 9 is a flowchart illustrating a specific example of operation when the MFP 100 spools the ubiquitous job. The CPU 10 of the MFP 100 reads the program stored in the ROM 11 into the RAM 12 to execute and fulfills each function in FIG. 8, and the operation illustrated in the flowchart in FIG. 9 is realized.

With reference to FIG. 9, when the CPU 10 receives the ubiquitous job from another MFP 100 and the PC 300 (Yes at step S101), this compares the print setting of the ubiquitous job with the printing function thereof to determine whether the ubiquitous job is processable (step S103). When the CPU 10 determines that the ubiquitous job may be printed (Yes at step S105), this stores the ubiquitous job in the memory to save (spool) (step S107).

When the CPU 10 determines that the ubiquitous job cannot be printed (No at step S105), this performs a process for transferring the ubiquitous job to the MFP 100 specified as the next transfer destination in advance out of a plurality of MFPs 100 included in this system. At that time, the CPU 10 may select the MFP 100 as the transfer destination according to the user or the group of users who issue the ubiquitous job, the type of ubiquitous job and the like.

Furthermore, the CPU 10 determines whether it is possible to transfer. Specifically, when the parameter being the counter for counting the number of times of transfer is included in the ubiquitous job (Yes at step S109), the CPU 10 compares the number of times of transfer indicated by the parameter with the total number of MFPs 100 included in this system to determine whether it is possible to transfer. That is to say, when the number of times of transfer of the ubiquitous job indicated by the parameter is not larger than the total number of MFPs 100 included in this system, the CPU 10 determines that the ubiquitous job may be transferred (Yes at step S111), increments the parameter by one (step S113), and transfers the ubiquitous job to the MFP 100 specified as the next transfer destination in advance (step S115). Then, the CPU 10 finishes a series of operations to return to the start and waits for the next ubiquitous job to be received.

On the other hand, when the number of times of transfer of the ubiquitous job indicated by the above-described parameter is equal to or larger than the total number of MFPs 100 included in this system, the CPU 10 determines that the ubiquitous job cannot be transferred (No at step S111). In this case, the CPU 10 may store the ubiquitous job in the memory thereof to save (spool) (step S107). As another example, this may notify the PC 300 which issues the ubiquitous job without saving the same in the memory. Then, the CPU 10 finishes a series of operations to return to the start and waits for the next ubiquitous job to be received.

Meanwhile, when the above-described parameter is not included in the received ubiquitous job, the CPU 10 may assign the parameter being the counter to the ubiquitous job (step S117) and transfer the ubiquitous job to the MFP 100 specified as the next transfer destination (step S115). Then, the CPU 10 finishes a series of operations to return to the start and waits for the next ubiquitous job to be received.

Effect of Embodiment

In the system according to this embodiment, when the PC 300 issues the ubiquitous job, the printer driver of the PC 300 selectably presents the printing functions of all the MFPs 100A to 100E included in this system and accepts the selection. Therefore, it is not always true that the print setting of the generated ubiquitous job may be processed by the printing functions of all the MFPs 100A to 100E. That is to say, there is a case in which the ubiquitous job on which the print condition which cannot be processed by the printing function of some of the MFPs 100A to 100E is set is generated.

In this system, it is possible to determine whether the ubiquitous job can be processed by a simple process to compare the printing function thereof with the print condition set on the ubiquitous job by operating in the above-described manner. Then, the MFP 100 stores the ubiquitous job which may be processed in the memory of the MFP 100 to spool. That is to say, the ubiquitous job issued to this system is automatically spooled in the MFP 100 capable of processing the ubiquitous job by the simple process.

In normal ubiquitous printing, the user may issue the instruction to print to an optional MFP 100 out of the MFPs 100A to 100E included in the system and allow the MFP 100 to process the ubiquitous job. However, there is the ubiquitous job which cannot be processed depending on the MFP 100 as described above, so that the user should find the MFP 100 capable of processing and issue the instruction to the MFP 100 in order to process a specified ubiquitous job.

In this system, when the user logs in to any MFP 100, the user is notified of the MFP 100 in which the ubiquitous job is spooled, that is to say, the MFP 100 capable of processing the ubiquitous job as illustrated in FIG. 6 when the user's ubiquitous jobs are listed. Therefore, the user may grasp the MFP 100 to which the user should issue the print instruction at a glance. Therefore, the user may issue the print instruction to the MFP 100 which may print rapidly to obtain a printed material rapidly. That is to say, this system may shorten waiting time for the user to obtain the printed material.

Furthermore, in this system, since the ubiquitous job is spooled in the MFP 100 which may process, it may be said that the MFP 100 is the MFP 100 to which the user highly probably issues the print instruction. Therefore, it is possible to inhibit a transfer process of the ubiquitous job from another MFP which spools the ubiquitous job to the MFP 100 which processes the same to rapidly start the process at the time of the process of the ubiquitous job. That is to say, this system may shorten the waiting time for the user to obtain the printed material. A communication volume may also be reduced.

Furthermore, in this system, even when the issued ubiquitous job can be processed by none of the MFPs 100, it is possible to prevent continuous transfer of more than one cycle among all the MFPs 100 included in this system by operating in the above-described manner. According to this, it is possible to inhibit unnecessary transfer.

Furthermore, as described above, since the order of transfer of the ubiquitous job in this system is determined according to the user or according to the type of job, it becomes possible that the MFP 100 to which the user highly possibly issues the print instruction spools the ubiquitous job at a higher accuracy. Therefore, the waiting time for the user to obtain the printed material may be further shortened.

Another Example

Furthermore, it is also possible to provide the program for allowing the CPU 10 of the MFP 100 to execute the above-described process. It is possible to construct this system by using an existing MFP, that is to say, the MFP already installed in an office and the like to be connected through the LAN and the like or to add a new MFP to the constructed system by providing the program.

It is possible to record such program on a computer readable recording medium such as a flexible disk, a CD-ROM (compact disk-read only memory), a ROM, a RAM, and a memory card attached to a computer to provide as a program product. Alternatively, it is also possible to record the same on the recording medium such as a hard disk embedded in the computer to provide the program. It is also possible to provide the program by download through the network.

Meanwhile, the program according to the present invention may be the program which calls necessary modules out of program modules provided as a part of an operating system (OS) of the computer in predetermine order at predetermined timing and allows the same to execute the process. In this case, the above-described module is not included in the program itself and the process is executed in cooperation with the OS. Such program which does not include the module may also be included in the program according to the present invention.

The program according to the present invention may also be embedded in a part of another program to be provided. In this case also, the module included in the above-described other program is not included in the program itself and the process is executed in cooperation with the other program. Such program embedded in the other program may also be included in the program according to the present invention.

The provided program product is installed on a program storage unit such as the hard disk to be executed. Meanwhile, the program product includes the program itself and the recording medium on which the program is recorded.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A printing system comprising a plurality of printers capable of communicating with each other, wherein
each of the plurality of printers includes:
a memory configured to store a received job; and
a hardware processor configured to;
transmit/receive a job;
determine whether a print setting of the received job is processable by a printing function of the printer itself; and
store the job in the memory when the print setting of the received job is determined to be processable by the printing function of the printer itself and automatically transfer the job to any printer of the plurality of printers when the print setting of the received job is determined to be not processable.

2. The printing system according to claim 1, wherein
the job includes a parameter for counting a number of times of transfer, and
each of the plurality of printers increments the parameter by one when transferring the job by the communication unit and transfers the job by the communication unit when the parameter is not larger than a number of the plurality of printers stored in advance.

3. The printing system according to claim 2, wherein
each of the plurality of printers further includes an assignment unit configured to assign the parameter to the job when the job does not include the parameter.

4. The printing system according to claim 1, wherein
each of the plurality of printers stores a history of transfer to any printer of the plurality of printers in the memory for each received job and transfers the job when the transfer history of the job is not stored in the memory.

5. The printing system according to claim 1, wherein
when each of the plurality of printers accepts login of a user, each of the plurality of printers notifies of a printer capable of printing the job for each job of the user who logs in stored in the memory of any of the plurality of printers.

6. The printing system according to claim 1, wherein
each of the plurality of printers transfers the job to a printer specified as a next printer in advance out of the plurality of printers when the print setting is determined to be not processable.

7. The printing system according to claim 1, wherein
each of the plurality of printers transfers the job to any printer of the plurality of printers determined in advance included in the printing system.

8. The printing system according to claim 1, wherein each of the plurality of printers prohibits transfer of the job back to the same printer again.

9. A printer comprising:
a memory configured to store a received job; and
a hardware processor configured to:
communicate with another printer of a plurality of printers;
determine whether a print setting of the received job is processable by a printing function of the printer itself; and
store the job in the memory when the hardware processor determines that the print setting of the received job is processable by the printing function of the printer itself, and
automatically transfer the job to any printer of the plurality of printers when the hardware processor determines that the print setting of the received job is not processable by the printing function of the printer itself.

10. The printer according to claim 9, wherein
the job includes a parameter for counting a number of times of transfer, and
the hardware processor increments the parameter by one when transferring the job and transfers the job when the parameter is not larger than a number of the plurality of printers stored in advance.

11. The printer according to claim 10, further comprising an assignment unit configured to assign the parameter to the job when the job does not include the parameter.

12. The printer according to claim 9, wherein
the memory stores a history of transfer to any printer of the plurality of printers for each received job, and
the hardware processor transfers the job when the transfer history of the job is not stored in the memory.

13. The printer according to claim 9, further comprising a notification unit which notifies of a printer capable of printing the job for each job of a user who logs in stored in the memory of any of the plurality of printers when accepting login of the user.

14. The printer according to claim 9, wherein
the hardware processor transfers the job to a printer specified as a next printer in advance out of the plurality of printers when the hardware processor determines that the print setting is not processable.

15. The printer according to claim 9, wherein
the hardware processor transfers the job to any printer of the plurality of printers determined in advance.

16. The printer according to claim 9, wherein each of the plurality of printers prohibits transfer of the job back to the same printer again.

17. A method of processing a job in a printing system including a plurality of printers capable of communicating with each other, wherein
a first printer out of the plurality of printers includes steps of:
(a) determining, when receiving the job, whether a print setting of the job is processable by a printing function of the first printer;

(b) storing the job in a memory of the first printer when the print setting of the job is determined to be processable by the printing function of the first printer at the step (a); and (c) automatically transferring the job from the first printer to a second printer being any printer of the plurality of printers when the print setting of the received job is determined to be not processable by the printing function of the first printer at the step (a).

18. The method of processing a job according to claim 17, wherein
the job includes a parameter for counting a number of times of transfer, and
the parameter is incremented by one when the job is transferred and the job is transferred when the parameter is not larger than a number of the plurality of printers stored in advance at the step (c).

19. The method of processing a job according to claim 18, further comprising a step of:
(d) assigning the parameter to the job when the job does not include the parameter.

20. The method of processing a job according to claim 17, further comprising a step of:
(e) storing a history of transfer to any printer of the plurality of printers in the memory for each received job, wherein the job is transferred when the transfer history of the job is not stored in the memory at the step (c).

21. The method of processing a job according to claim 17, further comprising a step of:
(f) notifying of a printer capable of printing the job for each job of a user who logs in stored in the memory of any of the plurality of printers when accepting login of the user.

22. The method of processing a job according to claim 17, wherein
the job is transferred to a printer specified as a next printer in advance out of the plurality of printers when the print setting is determined to be not processable at the step (a) at the step (c).

23. The method of processing a job according to claim 17, wherein
the job is transferred to any printer of the plurality of printers determined in advance included in the printing system at the step (c).

24. The method of processing a job according to claim 17, wherein each of the plurality of printers prohibits transfer of the job back to the same printer again.

25. A non-transitory recording medium storing a computer readable program which allows a printer to execute a process of a job in a printing system including a plurality of printers capable of communicating with each other, wherein the program allows the printer to execute steps of:
(a) receiving the job from another device;
(b) determining whether print setting of the received job is processable by a printing function of the printer itself;

(c) storing the job in a memory of the printer when the print setting of the received job is determined to be processable by the printing function of the printer itself; and (d) automatically transferring the job to any printer of the plurality of printers when the print setting of the received job is determined to be not processable by the printing function of the printer itself.

26. The non-transitory recording medium storing a computer readable program according to claim 25, wherein
the job includes a parameter for counting a number of times of transfer,
the program which processes the job further allows the printer to execute a step of (e) incrementing the parameter by one when transferring the job, and
transfers the job when the parameter is not larger than a number of the plurality of printers stored in advance at the step (d).

27. The non-transitory recording medium storing a computer readable program according to claim 26, wherein the program which processes the job further allows the printer to execute a step of (f) assigning the parameter to the job when the parameter is not included in the job.

28. The non-transitory recording medium storing a computer readable program according to claim 25, wherein
the program which processes the job further allows the printer to execute a step of (g) storing a history of transfer to any printer of the plurality of printers in the memory for each received job, and
transfers the job when the transfer history of the job is not stored in the memory at the step (d).

29. The non-transitory recording medium storing a computer readable program according to claim 25, wherein
the program which processes the job further allows the printer to execute a step of (h) notifying of a printer capable of printing the job for each job of a login user stored in the memory of any of the plurality of printers when accepting login of the user.

30. The non-transitory recording medium storing a computer readable program according to claim 25, wherein
the program which processes the job transfers the job to a printer specified as a next printer in advance out of the plurality of printers when the print setting is determined to be not processable at the step (b) at the step (d).

31. The non-transitory recording medium storing a computer readable program according to claim 25, wherein
the program which processes the job transfers the job to any printer of the plurality of printers determined in advance included in the printing system at the step (d).

32. The non-transitory recording medium storing a computer readable program according to claim 25, wherein each of the plurality of printers prohibits transfer of the job back to the same printer again.

* * * * *